(12) United States Patent
Evanitsky et al.

(10) Patent No.: US 9,282,080 B2
(45) Date of Patent: Mar. 8, 2016

(54) CUSTOMER VETTED DEVICE STATUS COMMUNICATION SYSTEM AND METHOD

(71) Applicant: Xerox Corporation, Norwalk, CT (US)

(72) Inventors: Eugene S Evanitsky, Pittsford, NY (US); Michael Burkard, Canandaigua, NY (US); Lawrence W. Meyer, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 347 days.

(21) Appl. No.: 13/792,714

(22) Filed: Mar. 11, 2013

(65) Prior Publication Data

US 2014/0258448 A1 Sep. 11, 2014

(51) Int. Cl.
G06F 15/16 (2006.01)
H04L 29/06 (2006.01)
H04L 29/08 (2006.01)

(52) U.S. Cl.
CPC .......... *H04L 63/0227* (2013.01); *H04L 63/102* (2013.01); *H04L 63/1425* (2013.01); *H04L 67/22* (2013.01)

(58) Field of Classification Search
CPC ...... H04L 29/08; G06F 3/1229; G06F 3/1238
USPC ......................................................... 709/217
See application file for complete search history.

(56) References Cited

U.S. PATENT DOCUMENTS

| | | | |
|---|---|---|---|
| 6,045,206 A * | 4/2000 | Igval | B41J 2/01 347/19 |
| 6,466,328 B1 | 10/2002 | Bradley et al. | |
| 6,798,997 B1 | 9/2004 | Hayward et al. | |
| 6,832,250 B1 | 12/2004 | Coons et al. | |
| 6,982,802 B2 | 1/2006 | Borg et al. | |
| 7,343,375 B1 | 3/2008 | Dulac | |
| 7,362,461 B2 | 4/2008 | Reddy et al. | |
| 7,480,936 B2 | 1/2009 | Lyon et al. | |
| 7,490,045 B1 | 2/2009 | Flores et al. | |
| 2003/0195982 A1 * | 10/2003 | Motoyama | G06F 11/2294 709/238 |
| 2004/0059953 A1 | 3/2004 | Purnell | |
| 2004/0187028 A1 | 9/2004 | Perkins et al. | |
| 2006/0050294 A1 | 3/2006 | Smith et al. | |
| 2007/0021966 A1 | 1/2007 | Ellefson et al. | |
| 2008/0319926 A1 | 12/2008 | Alam et al. | |
| 2009/0147299 A1 * | 6/2009 | Tetu | H04L 43/0817 358/1.15 |
| 2010/0049803 A1 | 2/2010 | Ogilvie et al. | |
| 2010/0257153 A1 | 10/2010 | Day et al. | |

* cited by examiner

*Primary Examiner* — Jude Jean Gilles
*Assistant Examiner* — Jaren M Means
(74) *Attorney, Agent, or Firm* — Maginot Moore & Beck LLP

(57) ABSTRACT

A system and method for transmitting device status information from a first internal network, through a first internal network firewall, over an external communications network and to a second network wherein the first internal network includes a marking device and a computing device having a memory. Usage data is collected from the marking device and compared to previously stored usage data to determine the validity of the collected usage data to provide a comparison result. The comparison result is used to determine whether the collected usage data can be transmitted from the first internal network, through the firewall, and through the external communications network to the second network.

9 Claims, 4 Drawing Sheets

| SERIAL NUMBER | MACHINE | READ TIME | METERS | VALUE | VALIDATION CHECK | CUSTOMER PROVIDED COMMENT |
|---|---|---|---|---|---|---|
| GYA891505 | VENDOR MODEL 1111 | 8/31/2012 3:15 UTC | B/W IMPRESSIONS<br>COLOR IMPRESSIONS<br>TOTAL IMPRESSIONS | 75,044<br>15,551<br>90,595 | OK<br>OK<br>SUSPECT - UNEXPECTEDLY HIGH VOLUME THIS MONTH | 700 UNUSABLE COPIES DUE TO EXCESSIVE JAMMING |
| GYA891231 | VENDOR MODEL 2222 | 8/31/2012 12:15 UTC | B/W IMPRESSIONS<br>COLOR IMPRESSIONS<br>TOTAL IMPRESSIONS | 75,044<br>15,551<br>90,595 | | OK - ONE OF OUR OTHER MACHINES WAS NOT WORKING SO THIS ONE PICKED UP THE VOLUME. VOLUME WAS ALSO CHECKED AT THE DEVICE AND VERIFIED. |
| UHA002227 | NON-VENDOR MODEL 3333 | 8/18/2012 1:25 UTC | B/W IMPRESSIONS<br>COLOR IMPRESSIONS<br>TOTAL IMPRESSIONS<br>TOTAL LARGE IMPRESS. | ☐<br>☐<br>☐<br>☐ | | DEVICE INFORMATION DELETED - THIS IS NOT UNDER CONTRACT WITH VENDOR |
| UHA002249 | VENDOR MODEL 4444 | 8/31/2012 12:23 UTC | B/W IMPRESSIONS<br>COLOR IMPRESSIONS<br>TOTAL IMPRESSIONS<br>TOTAL SCAN JOBS | 75,044<br>15,551<br>90,595<br>5,556 | | |
| LBP360395 | NON-VENDOR MODEL 5555 | 8/31/2012 10:10 UTC | | | | DEVICE OUT OF CONTRACT |

FIG. 4

CUSTOMER VETTED DEVICE STATUS COMMUNICATION SYSTEM AND METHOD

TECHNICAL FIELD

The present disclosure relates to systems and methods for the transmission of information between a vendor and a customer, and more particularly to systems and methods to facilitate customer vetting of device status information prior to transmission to a vendor.

BACKGROUND

In the current market environment, particularly in regard to office equipment such as printers, copiers, and computers, an economic premium is placed on the ability for vendors, which lease or rent such equipment, to interact with a customer regarding the status of the office equipment, including the type of and the amount of use to which the office equipment is being dedicated. While such usage information is particularly helpful to a vendor in providing accurate and timely services to support the operation of the office equipment, such information also provides the vendor with information necessary to accurately bill the customer for the use of the office equipment pursuant to the leasing or rental agreements, hereinafter referred to as "agreements." For instance, each printer or copier under an agreement can include a metering device which records the number of sheets of paper being copied or printed on a daily, weekly, or monthly basis. Such information can be required under certain agreements to enable the vendor to provide accurate and timely invoices to the customer.

Getting accurate and timely meter readings from devices located at a customer facility in the field is therefore particularly desirable. In many of these agreements, vendor access to such information is a key enabler to bill the customer and to provide other services. In most of these agreements, the customer is contractually obligated to provide this data. Once the data is received at the vendor location, the data is validated to insure that the data represents an accurate representation of the amount of copies being made or printed. In some cases, automated systems are put in place to gather usage data from devices in the field and to transmit the usage data to the vendor, either from individual devices or through proxies that aggregate usage data from many devices.

While the collection and transmission of data by a customer and to a vendor is technically possible under certain conditions, some customers can be unwilling to transmit such usage information automatically through a communication network due to network security concerns. Oftentimes, the information technology (IT) department of such customers does not allow machine or device data to leave the customer's facility. When a device or a proxy sends the data automatically, the IT department does not have a mechanism to check all of the data that is being generated and transmitted, so the transmission of the data is blocked, even though the data most often includes only meter readings, which is not typically considered sensitive data.

Due to security concerns, various methods have been developed to provide alternative and acceptable transmission methods. One such method is manual and time intensive in nature. This manual method occurs where a customer goes from one machine to the next machine to write down the billing meter information. Once the meter information is gathered, the customer makes a phone call to a vendor service representative or to an on-site data analyst who records the data manually. This method, and others like it of manually gathering information, requires continued attention on the part of the customer, which may not always be present due to more pressing concerns of the business. In addition, the customer can be frustrated by the phone-in process, since the appropriate service representative may not be available when called. The manual method can also be prone to errors.

In other situations, the information is electronically recorded to electronic media, such as a thumb drive, if this type of capability is enabled and is authorized by the customer. The information can then be e-mailed or physically carried back to the vendor. In some cases, however, the act of physically carrying the data collected from network devices to a vendor can also be a security violation. Consequently, in those situations where a customer restricts access to billing information, the resulting loss in revenue can be very large.

SUMMARY

A customer vetted device status communication system and method described in this application facilitates the transmission of device data to a vendor. The system and method provide a tool to automatically collect device data which can be reviewed by the customer before transmission to a vendor. The review can be either a manual review of device data or can be an automatic review of device data based on predetermined parameters which can be established by the customer. In one embodiment, the automatic meter readings take place on a daily basis and the collection of daily meter readings is made on a monthly basis for transfer to the vendor. The meter reading can be configured for a given customer site based on the needs and capabilities of the vendor and the customer.

A method of transmitting device status information includes transmitting the status information from a first internal network, through a first internal network firewall, over an external communications network to a second network. The first internal network includes at least one marking device and at least one computing device having a memory. The method includes collecting data from the at least one marking device, comparing the collected data to a predetermined value stored in the memory to provide a comparison result, validating the acceptability of the collected data based on the comparison result, and transmitting the collected data from the first internal network, through the firewall, and through the external communications network to the second network.

A system of transmitting device status information includes a computing device, a data vetting application, and a marking device. Data related to the marking devices is transmitted from a first internal network, through a first internal network firewall, over an external communications network to a second network. The system includes a marking device configured to generate marked media wherein the marking device is operatively connected to the first internal network. A computing device is operatively connected to the first internal network wherein the computing device includes a memory configured to store program instructions and a database. The computing device also includes a controller configured to execute the stored program instructions to collect data from the marking device, to compare the collected data to a predetermined value stored in the memory to provide a comparison result, to validate the acceptability of the collected data based on the comparison result, and to transmit the acceptable data from the first internal network, through the firewall, and through the external communications network to the second network.

Other benefits and advantages of the customer vetted device status communication system and method will become apparent upon reading and understanding the following and specification including the drawings.

BRIEF DESCRIPTION OF THE DRAWINGS

The preferred embodiments will be described in detail, with reference to the following figures, wherein:

FIG. 4 is a table including customer vetted data for transmission to a vendor.

DETAILED DESCRIPTION

Although the various embodiments are illustrated below in conjunction with the processing of communications in an exemplary system, other particular system configurations can be used. Those skilled in the art will recognize that a variety of different communication system configurations are used. Communication systems include those systems employing Internet protocol (IP) communications, video calls, multimedia calls, e-mail, faxes, text chat, voice over IP or voice messages as well as various portions or combinations of these and other types of communications. In addition, the systems and methods described herein are applicable to the processing of incoming communications, outgoing communications or both.

Figure 1:
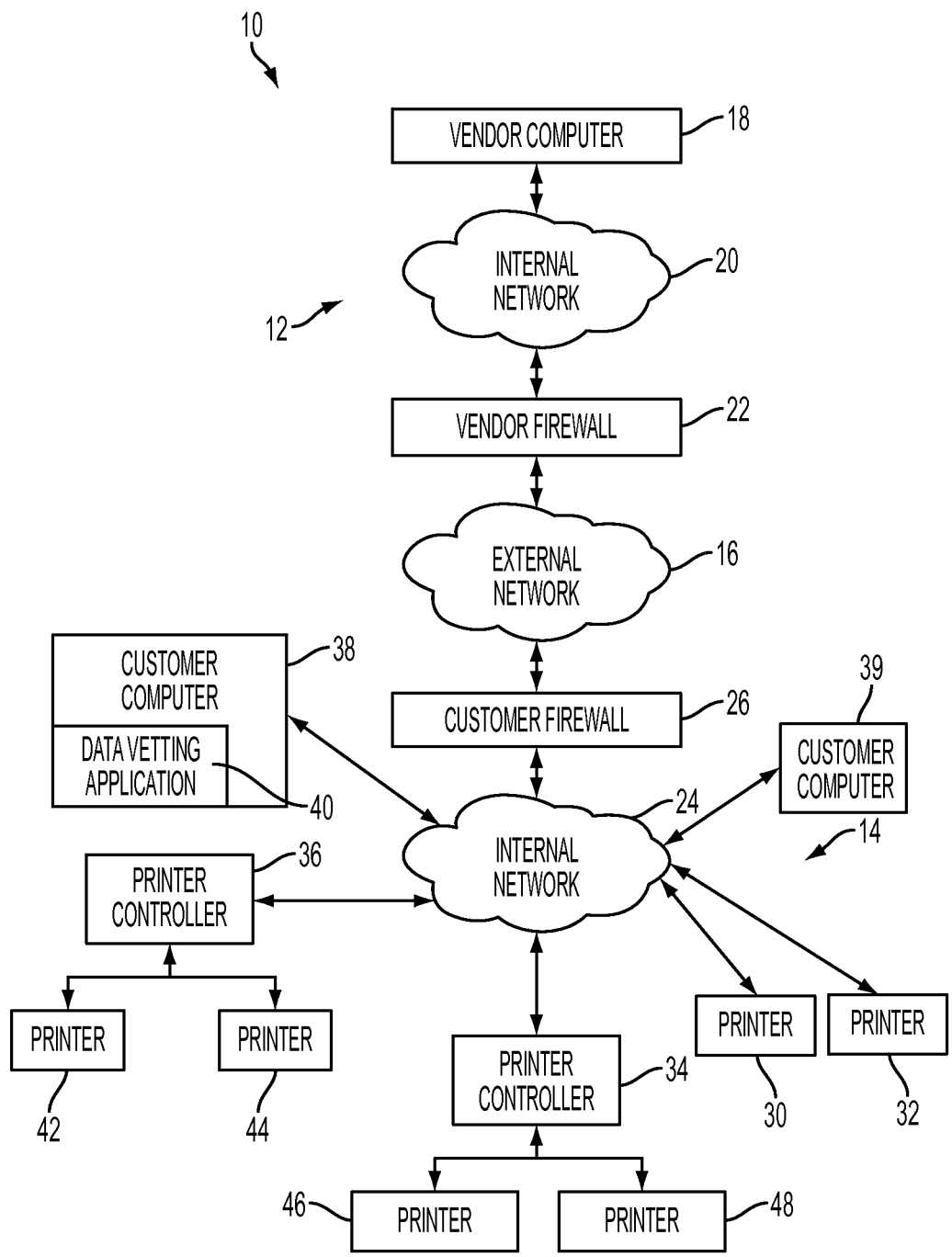
FIG. 1 illustrates a communications system enabling the electronic transmission of customer vetted data between a customer and a vendor.

In the drawings, like reference numerals have been used throughout to designate like elements. As shown in FIG. 1, a communications system 10 includes a vendor network 12 operatively connected to a customer network 14 through an external network 16. The vendor network 12 includes at least one vendor computer 18 operatively connected to an internal network 20 which includes a vendor firewall 22. While a vendor computer 18 is generally embodied as a personal or desktop computer, other computing devices can be used including a mainframe computer, a personal digital assistant, a laptop computer, and a smartphone. In addition, while one computer 18 is illustrated, more than one computer can be connected to the vendor internal network 20.

The vendor network 12 is operatively connected to the customer network 14 through the external network 16. The customer network includes an internal network 24 and a customer firewall 26. To facilitate communication between the vendor network 12 and the customer network 14, the external network can include any number of different types of networks including one or more of wide area network(s), intranet(s), the Internet or any other type of distributed network. In addition, the network 16 can include, any one of or a combination of, a direct serial connection, a distributed network such a local area network, a public network, a metropolitan area network, a wide area network, a satellite communication network, an infrared communication network, or the like. Furthermore, the transmission of information within the internal networks 12 and 14 can be a wired or wireless link or any other known or later developed element(s) that is capable of supplying electronic data to and from the connected elements. In addition, the transmission of information to and from the internal networks 12 and 14 to the external network 16, and the transmission of information within the external network 16 can be a wired or wireless link or a combination thereof.

As shown in FIG. 1, each of the vendor network 12 and the customer network 14 includes the firewalls 22 and 26 which can include either a software or a hardware based network security system configured to control the transmission of information to and from the external network 16. The firewalls 22 and 26 can each be any known or later-developed combination of one or more software elements and/or one or more hardware elements that control access to the networks 12, 14 and 16. While firewalls 22 and 26 are depicted separately, the firewalls 22 and 26 are not necessarily separate and distinct components. Thus, the functions and/or operations of the firewalls 22 and/or 26 can be carried out by any one or more known or later-developed software and/or hardware elements. In an alternative embodiment, the customer network 14 can be directly operatively connected to the vendor network 12 thereby bypassing any external network, where the security of the information being transmitted is of high importance and has been properly vetted.

A customer facility can include one or more marking devices, such as printers 30 and 32, one or more printer controllers 34 and 36, and at least one customer computer 38 including a data vetting application 40. One or more additional customer computers 39 can be included. Each of the print controllers 34 and 36 can be operatively connected to one or more printers 42, 44, 46, and 48. The print controllers 34 and 36 are configured to schedule and to optimize multiple printing jobs among the printers respectively operatively connected thereto. Each of the printers 30 and 32 includes a status device or meter, not shown, which provides status information or data for each printer 30 and 32 over the internal network 24 to the customer computer 38. Each of the printer controllers 34 and 36 also include a status device, not shown, which provides status information and/or usage data of each of the printers 42, 44, 46, and 48 to the customer computer 38. Any type of marking device to mark media can be included in the customer facility including copiers, printers, and facsimile machines having marking engines using toner, liquid ink, wax based ink, and/or solid ink.

While status information, such as control data, process data, and diagnostic data, can be provided from each of the printers, the usage data typically considered to be most relevant to the vendor includes model identification, the type of impressions being made (color or black and white), and number of impressions made during the course of operation. The status device of each of the printers and the printer controller are embodied as hardware, firmware, or software resident within the respective device controllers and/or memories which receive and store informational data. The data vetting application 40 is configured to provide one, some, or all of the following tasks including: to collect the data from each of the printers and/or printer controllers, to arrange, to modify and/or to annotate the data based on either predetermined conditions or under the direction of a user or administrator, to interrogate the status of each of the printers and/or printer controllers if directed, and to transmit the data once the data is ready for transmission.

Figure 2:
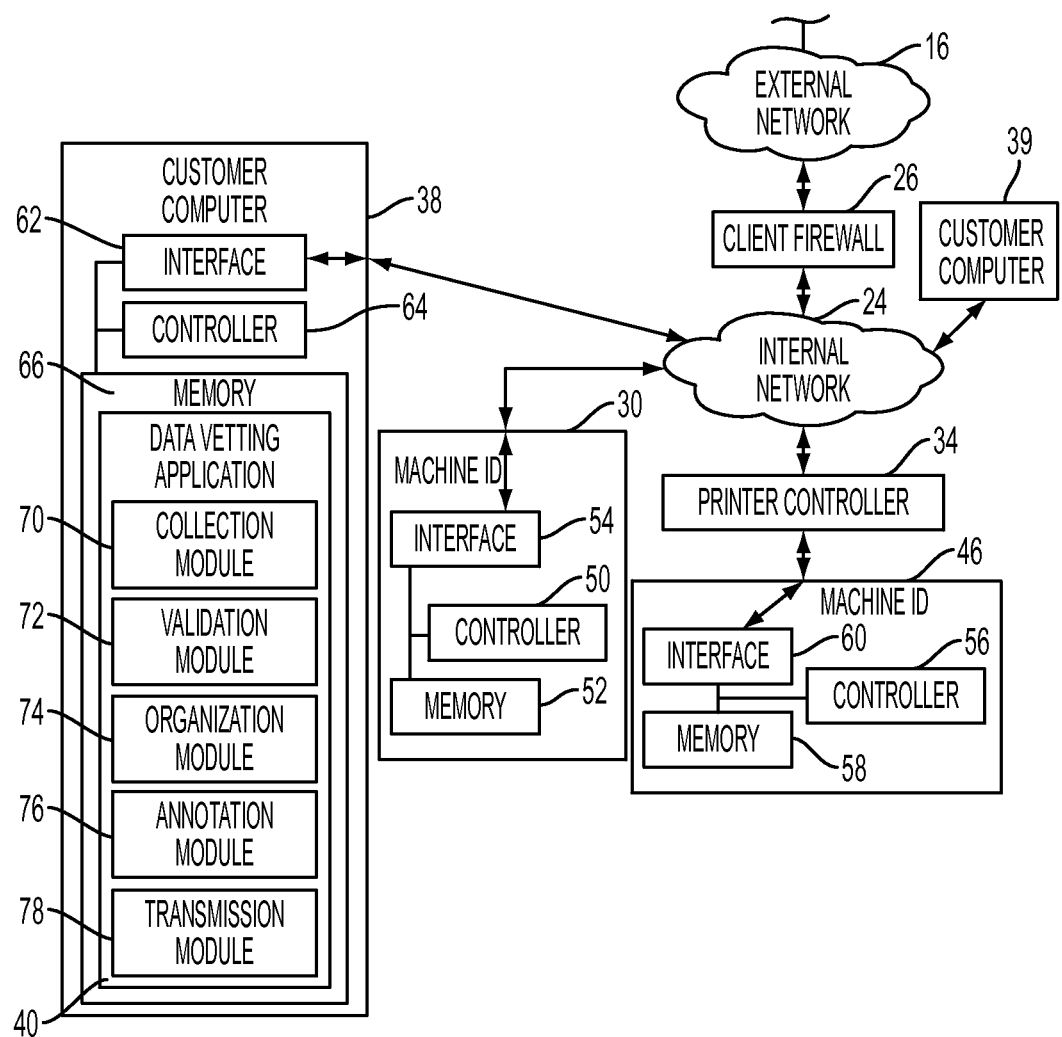
FIG. 2 is a functional block diagram illustrating an embodiment of a customer communication system portion of FIG. 1

FIG. 2 illustrates the customer facility 14 and in particular the printer 30, the printer controller 34 operatively connected to the printer 46, and the customer computer 38. Each of the printers is identified by a machine identifier (ID) which provides a unique identifier used by the data vetting application 40 as described herein. In one embodiment, the customer computer 38 collects data and generates a data file to be vetted as described herein. The customer computer 39, or any other computer on the internal network 24, can be used to process data forms, also described herein, before transmission to the vendor. The machine identifiers in different embodiments take many different forms as long as each identifier uniquely identifies a machine, such as a serial number or a model number. The printer 30 includes a controller 50 and a memory 52 each of which are operatively connected to an interface 54. The printer 46 similarly includes a controller 56 and a memory 58, each of which is operatively connected to an interface 60. The remaining printers and printer controllers of FIG. 1 are not shown in FIG. 2 for ease of discussion, but those printers and printer controllers can be incorporated into the described system and method and can include one or more of a memory, a controller, and an interface. Likewise, in other embodiments, additional printers and printer controllers in any number or combination can be incorporated into described system and method. The interface 54 of the printer 30 printer controller 34 is operatively connected to the internal network 24.

The customer computer 38 includes an interface 62 operatively connected to a controller 64 and to a memory 66. The interface 62 receives data provided by the printer 30 and the printer controller 34 as well as transmits data from the customer computer 38 to the printer 30 and printer controller 34 through the internal network 24. While the customer computer 38 is generally considered to be a stand-alone personal computer configured to communicate with the other devices over the internal network 24, the customer computer 38 is not limited to a standalone computer but can also include a laptop computer, a personal digital assistant, and a "smart" phone. Other self-contained computing devices can also be used. In another embodiment, the internal network 24 can be configured as a "cloud" computing network where all the applications, typically resident on a standalone computer, are located in the "cloud", typically a server. In such a cloud environment, the customer computer can include a web browser device, a mobile application device, a thin client, or a terminal emulator. In each of these particular embodiments, the data vetting application is resident in the cloud.

The data vetting application 40 can be embodied as hardware, software, or firmware. If embodied as software, software code is stored in the memory 66 or in the cloud. The data vetting application includes a plurality of modules, where each of the modules is dedicated to a particular purpose or task directed to the collection and transmission of the information to the vendor facility.

The data vetting application 40 includes one or more of the following: a data collection module 70, a validation module 72, an organization module 74, an annotation module 76, and a transmission module 78. The collection module 70 is configured to collect the informational and usage data stored in the memories of the printers 30 and 46. While only two devices are described, information from additional devices can be collected to provide a single report aggregating data from all of the devices on the network. In addition, individual reports directed to individual devices can also be provided. In one embodiment, the collection module 70 transmits a data collection signal to each of the controllers 50 and 56 indicating that the stored data should be transmitted to the customer computer 38. The data collection signal can either be automatically generated by the collection module 70 according to a predetermined schedule or predetermined frequency or the data collection signal can be manually transmitted by a user or administrator when desired. In addition, the data collection signal can request all data stored in the memories 52 and 58 or can request some of the information stored in each of the memories or can request only data stored in one of the memories. When retrieving the requested data, the data can be configured to include the device data and an exact time stamp of when the data reading was collected. The data reading can also be used to collect other types of data that the customer desires to review. For example, the customer can be notified when a supply of paper is running low. The collection module 70 can also be configured to enable the operator to request an immediate data reading rather than use the data reading programmed to occur on a reoccurring basis. In addition, the collection module 70 can be programmed to not collect certain sensitive data such as IP addresses, network masks or device locations. Such information can however be collected and either deleted or masked using the annotation module 76. Likewise, the collection module 70 can be set to automatically block specific devices such as non-vendor managed devices that are located on the network.

While the data collection module 70, in one embodiment, is configured to collect the required information from all of the devices on the network, the identification of the devices on the network for which data is required can either be entered manually into the data vetting application 40 or the data vetting application can be configured to automatically discover and identify the appropriate devices located in the network. The data vetting application 40 can discover all of the devices on the network or can be configured to discover only certain types of devices having predetermined characteristics. This function, however, does not need to be incorporated into the data collection module 70, but can be located as a standalone module or incorporated into a different module or provided as a function of the customer computer.

Upon receipt of the collected data, the data is stored in the memory 66. At this point, the validation module 72, which is configured to determine the transmissibility of the data from the customer to the vendor, analyzes the data according to a set of predetermined rules, the results of which can be reviewed if desired before transmission to the vendor. In determining whether the data is transmissible, the validation module 72 in one embodiment is configured to include determining whether the data is reasonably accurate and determining whether the data includes non-transmissible information such as confidential data or other data not relevant to the data to be transmitted.

The organization module 74 is configured to organize the usage data in a form acceptable to both the vendor and to the customer. Some of the organizational structure of the data provided by the vendor cannot be changed since certain types of data are required to perform a proper data transmission. Other data, which can be present in the usage data obtained from the printers, can be removed by the organization module 74 based on a predetermined specification or can be removed manually by the user or the administrator.

The annotation module 76 is configured to enable the user or administrator to annotate or add notations to provide comments or additional descriptions to the data as described later herein.

The transmission module 78 is configured to provide for the transmission of the data to the vendor once the data has been determined to be acceptable for transmission. Under some circumstances, the transmission of data can be automatically performed. In other circumstances, however, the transmission of data can be prevented by the validation module, for instance, if the data appears inaccurate, incorrect or is determined to be otherwise non-transmissible. If the validation module, for instance, flags the data as being inaccurate, transmission is halted and the user or administrator is notified of the existence of the flag. After a review, the user or administrator can determine that the usage data is acceptable and transmit the usage data manually.

When the operator is satisfied that the data is accurate, the operator can submit the data to the vendor via one or more of several pre-configured methods such as email, encrypted email, a file upload website, a web based drop box, or a person to machine device gateway. The operator can also choose to not send the data electronically. The operator can connect to a vendor website to upload the information. The operator can choose to make a phone call to the vendor to deliver the information verbally.

If the predetermined mechanism for delivery of information is overridden by the operator, the operator has the option of setting the transmission method back to the default type of transmission. In one embodiment, the data vetting application 40 can be a dedicated application which has been stored on the customer computer. In another embodiment, the data vetting application is a web tool accessible through a web browser to enable a customer to collect and to view aggregated billing meter data (and any other data) which can be provided by the collection module 70. Once the appropriate data has been collected, the data is placed in the form of a report which is sent to the vendor using the transmission module 78. The collection and transmission functions are less time consuming and more accurate than manual readings and the customer is enabled to provide extra information that pertains to billing by using the annotation module 76, if desired or if necessary.

In one embodiment, the data vetting application automatically collects the data, but prevents transmission of the data in the form of the data report until after the data has been vetted or provided by the customer. By providing the customer with the option of reviewing all of the data prior to transmission, the customer understands exactly the nature of data being transmitted from the customer to the vendor and eliminates errors caused by manually reading the data.

The annotation module 76 enables the customer to augment the data report with comments, but prevents the actual data, such as the number of copies, from being changed. For example, if a machine has a very high jam rate, the number of copies being counted does not accurately reflect the actual number of usable copies. Many copies are wasted in such a situation. If this situation occurs, the customer can annotate the data in the data report to request a credit for the number of unusable copies. While the actual data, such as the number of copies made, cannot be altered, other information which appears during the data collection process can be deleted altogether or at least redacted by making the undesirable data illegible. In one embodiment, the customer vets the data and deletes all information considered to be private, such as an internet protocol (IP) address. In addition, the annotation module 76 can be configured to enable deletion of those devices that are not part of an agreement, such as non-vendor device. Meter readings can be annotated by an operator to indicate that a meter reading should be adjusted for poor copy credits, for instance. In this situation, however, the actual meter read cannot be adjusted. If a meter reading is tagged as being suspect, the operator can either add a comment/explanation or perform a new reading. Customer contact information including the name of the operator can be changed and a backup contact can be provided in the event the operator is unavailable.

In one embodiment, the data vetting application 40 includes the validation module 72 which checks the validity or accuracy of the gathered data. By providing a validation check at the vendor facility, any errors or discrepancies regarding the data can be detected before being sent to the vendor. Consequently, any detected errors can be resolved before being transmitted.

In another embodiment of the data vetting application 40, the validation module 70 can be programmed to automatically validate the collected data and if validated, the transmission module 78 transmits the validated data automatically without further review. In this embodiment, the user or administrator can opt out of reviewing every meter reading from every machine every month. To enable this embodiment, the user or administrator establishes a set of rules which examine the number of copies or prints being made over a predetermined time period. A number of thresholds are established, which can include a lower threshold as well as a higher threshold. If the number of copies or printer exceeds a higher threshold or fails to reach a lower threshold, an automatic transmission of data does not occur and review process is triggered which can include manually vetting the data.

As an example in one customer facility, the operator determines that most meter readings are typically approved. In this case, the validation module 72 can be programmed to set one or more values or parameters to enable automatic submission of the data (by one of approved mechanisms) if certain thresholds are not exceeded. The operator configures the operating parameters such that if a data item meets those parameters, then that data item is automatically submitted. If a data item does not meet those parameters, then the user or operator is notified to review that data item.

Figure 3:
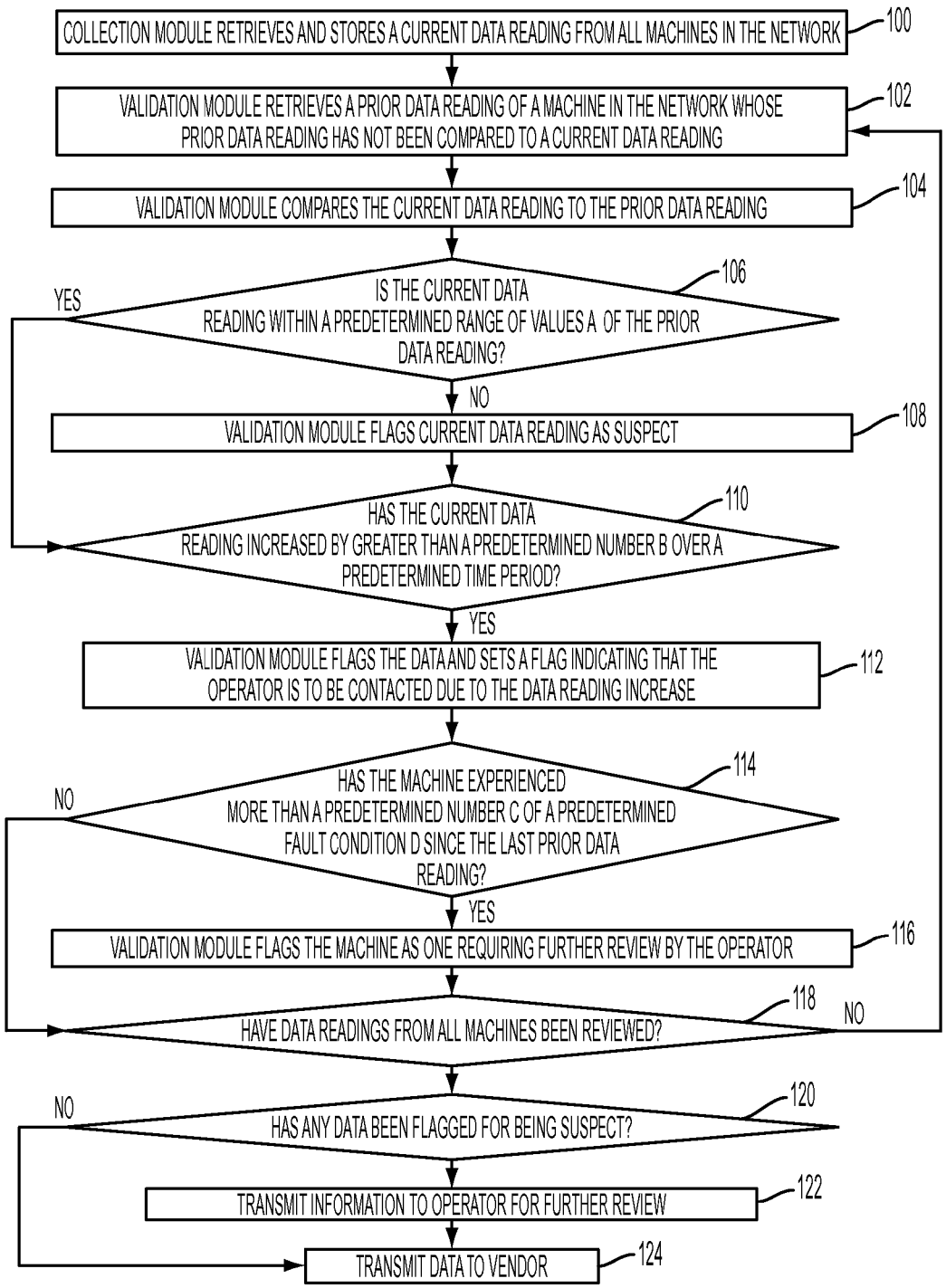
FIG. 3 is a flow diagram of a method for the collection and transmission of customer vetted data.

FIG. 3 illustrates one example of a method to determine if the data being collected by the collection module 70 can be transmitted automatically without further review by an operator. In this example, it is assumed that prior meter readings from a number of printers or copiers having been saved in the memory 66 for access by the validation module 72. In another embodiment, even though the data has been verified as being acceptable for transmission to the vendor, the data vetting application 40 can be configured to require customer approval before transmission occurs. Even if all of the automatic criteria have been satisfied, providing a mechanism for customer approval enables the customer to add comments or a memo about machine credits prior to transmission.

As illustrated in FIG. 3, the collection module retrieves and stores a current data reading form all of the machines in the network (block 100). The retrieval can be started either automatically or upon activation of a read signal transmitted to each of the machines. In one embodiment, all of the machines in the network are read, even the machines which do not fall under an agreement with the vendor. In another embodiment, only the machines falling under an agreement with the vendor are read. Once the current data has been stored, the validation module 72 retrieves a prior data reading from the memory which has not been compared to a current data reading (block 102). Upon retrieval, the validation module 72 compares the current data reading to the prior data reading (block 104). As a result of the comparison, it is determined whether the current data reading is within a predetermined range of values A of the prior data reading (block 106). In this comparison, the predetermined range of values A is established based on a pattern of usage developed over time. For instance, if 500 copies are typically made in a single month, the range of values which are acceptable and which do not need further review could be from 450 copies to 550 copies. In this situation, the predetermined range of values is plus or minus 50 for a total range of 100 centered about the prior month's usage figure.

If the current data reading is not within the predetermined range of values A, then the validation module 72 flags the current data reading as being suspect (block 108). If the data is flagged as being "suspect", this designation does not necessarily mean that the data is unacceptable, since there can be valid reasons as to why there is a discrepancy between the current data reading and the predetermined range of values.

For instance, if a reading on a meter rolls to over to zero or if a controller board is replaced, then the current month's billing meter reading can be smaller than the previous month's billing meter reading. In some situations, even if the data is flagged as being suspect, the data is still transmitted to the vendor with an annotation made to the suspect data by the customer. In another embodiment, the customer initiates a new reading to determine if the suspect flag is removed with the new data.

If, however, the current data reading is acceptable and after the current data has been flagged if the data is suspect, the method determines whether the current data reading increased by greater than a predetermined number B over a predetermined period of time (block 110). In this block, the collection module, while reading the usage data only once over a period of time, such as a month, collects usage data throughout the month including for instance every day of the month. The usage data can then be analyzed over a predetermined period of time such as week, so that trends in usage throughout the month can be determined. If the amount of usage increases over the predetermined period of time (e.g. a week), then the validation module flags the suspect data and set a flag indicating that the operator is to be contacted due to the data reading increase (block 112).

While the validation module is programmed to establish the acceptability of the usage data to be sent to the vendor, the collection module 70 and the validation module 72 can be programmed to respectively collect and validate additional information related to the devices which the vendor doesn't require, but which can be helpful to the vendor in supporting the customer. For instance, the collection module 70 can be configured to collect fault information which is recorded by the devices. In one embodiment, the number of paper jams is recorded for access by the collection module 70. Consequently, at block 100, the collection module 100 not only collects usage data, but also collects paper jam information. Other types of fault conditions include excess toner usage, excess ink usage, the number of service calls made to repair a particular device, and the number of service calls made for routine maintenance.

Using this information, the validation module 72 determines whether the machine being examined has experienced more than a predetermined number C of predetermined fault conditions D (block 114). If yes, the validation module 72 flags the machine as one requiring further review by the operator (block 116). If no or if the machine has been flagged at block 116, the validation module 72 determines whether all of the machine data has been reviewed (block 118). If no, the method returns to block 102 to continue reviewing the collected data. If yes, the validation module 72 review the data to determine whether any of the data has been flagged (block 120). If it has, the information including the flagged data is sent to the operator (block 122). In another embodiment, the information is not sent to the vendor, but a message, such as an e-mail message or a text message is sent to the operator to review the flagged data which can be accessed in memory prior to being sent to the vendor (block 124). If, however, no flags have been set, then the information requested by the vendor is automatically sent to the vendor by the transmission module 78 (block 124).

Data is transmitted as vetted data which can be either acceptable data or suspect data. In another embodiment, a completed form is printed out with an envelope including a pre-printed mailing address and a metered postage. The customer inserts the printed copy into the envelope and is mailed by either the US Postal Service or other carrier. The completed form can include machine readable representations of data including UPC barcodes and 2D barcodes including Aztec codes. Other types of machine readable codes can be used. The completed forms using machine readable representation of data can then be automatically processed at the vendor's facility.

While the data vetting application 40 can be configured as a standalone software program incorporating modules which are specifically developed to provide the desired features, off the shelf software can be incorporated into the data vetting application 40. For instance, a software package known as Outlook and provided by Microsoft Corporation includes voting buttons and templates which can be incorporated to allow the operator to review the data and make changes, approvals, notations via e-mail.

In one embodiment, the data vetting application 40 can be implemented on the customer computer 38 where the application 40 includes software or program code which provides the features described herein. In other embodiments, the data vetting application can be implemented on an individual processor, server, programmable logic controller (PLC) or another computing device separate from the customer computer 38. In other embodiments, the data vetting application can be embodied as hardware, firmware or software, where each module is implemented as an individual program or program code running independently and exchanging information between each other according to the disclosure in order to provide the robust operation. In addition, while the features of each module are described as having a relatively fixed set of features, one or more of the feature can be located in other modules if desired. In addition, the algorithms described herein, in other embodiments, are embodied as program code or program instructions in software and/or firmware resident in the customer computer 38 or are embodied as a remote program code or program instructions operatively connected to the customer internal network 24 through hardwired connections, connections to the internet, or other means of communication to software or firmware either wired or wireless.

In addition, the data vetting application 40 can be implemented on special purpose computers, programmed microprocessors or microcontrollers and peripheral integrated circuit elements, smart phones, personal digital assistants (PDAs), ASICs, or other integrated circuits, digital signal processors, hard-wired electronic or logic circuits such as a discreet element circuits, programmable logic devices such as a PLD, PLA, FPGA, PAL, or the like. In general, any device capable of implementing a finite state machine that is in turn capable of implementing the systems of FIGS. 1-3 can be used to implement the data vetting application 40.

The data vetting application 40 is configured to discover devices on the network 24 and to collect device data at a pre-configured frequency. The preconfigured frequency can be predetermined in the collection module 70 or can be changed in the collection module pursuant to operator input. The data validation module 72 checks the data and tags the data of interest appropriately. The data or a pointer to the data is then transmitted to a designated individual(s) within the customer enterprise, typically the operator who has access to the customer computer 38. Data is organized in the organization module 74 according to a predetermined format such as a table, an example of which is illustrated in FIG. 4 and described later herein. The operator receives a reminder, which can be generated by the collection module 70, when billing reads are due along with a pointer to the table containing the data. The operator then has access to the table which is reviewed and modified if necessary by the annotation module 76.

Furthermore, the methods shown in FIG. 3 can be readily implemented in software using object or object-oriented software development environments that provide portable source code that can be used on a variety of computer, workstation and/or personal digital assistant hardware platforms. Whether software or hardware is used to implement the disclosed systems and methods is dependent on the speed and/or efficiency requirements of the system, the particular function, and the particular software or hardware systems or microprocessor or microcomputer systems being utilized. The systems and methods described herein, however, can also be readily implemented in hardware or software using any known or later-developed systems or structures, devices and/or software by those skilled in the applicable art without undue experimentation from the functional description provided above together with a general knowledge of the computer arts.

FIG. 4 illustrates one embodiment of a report generated, annotated by, and transmitted by use of the data vetting application 40. In FIG. 4, the system is configured to read meters of all devices on the network on the last day of the month where Aug. 31, 2012 is used in the example. At midnight on August 31, coordinated universal time (UTC) or another designated time in a specific time zone, the devices are polled to get the requested data. Polling continues until all of the devices have reported the request data or until 12 Noon, August 31, whichever comes first. In this example, the data vetting application 40 indicates that there are meters to approve. The designated operator of the customer opens the application and reviews the table of data illustrated in FIG. 4.

In this example, the automatic comparison of the prior month's data to the current month's data is not made. Instead, the customer examines the current data and compares the current data to last month's data which can be accessed through the application 40. The customer adds comments in the column labeled "Customer provided Comment" because the customer is due some copy credits for paper jams occurring in the machine GYA891505. The report also indicates that the same machine, presumably fixed, printed an excessive number of documents. The rationale for this higher volume is noted in the column marked "Customer Provided Comment."

The volume for the device labeled LBP360395 is blacked out or deleted by the operator since the device is a non-vendor device. The information is not seen and the report can be sent with the information missing or redacted.

Pull down menus and/or hyperlinks can be placed in the report which is viewable on the monitor of the customer computer. In this way, the report can act as a user interface to enable the operator to work directly from the report when requesting that an additional task should be performed or requesting additional information. For instance, if the operator selects the machine having serial number UHA002227, a pull down menu, or drop down menu, appears which includes a selection such as "read now". The operator then selects "read now" from the pull down menu to request updated information from the selected device. If new data is available, the information in the spread sheet is updated along with the new read date. The pull down menu can also include other functions such as a "view now" button which enables the operator to view the current status of the machine including current data information as well as service calls. If the operator finds that the information is acceptable, the operator can select a "submit" function which encrypts the data and subsequently emails the information to the vendor.

As described herein, the customer vetted device status communication system and method enables a customer to vet machine data prior to submission to a vendor. By enabling a review prior to transmission, concerns of an IT department about automatic data collection and communication to a vendor can be reduced or overcome. This result can be provided even though the external transmission of the usage data has the possibility of occurring at a much higher frequency and density of data than an IT department typically finds acceptable. In addition, the present system and method performs validation checks at the source (the customer site) where discrepancies and other concerns can be resolved more quickly. A mechanism for the customer to allow some meter reads to be sent without vetting and only require the user under certain conditions is also provided. The customer also has the option to add additional information relevant to billing requirements.

The present disclosure also provides higher customer acceptance of transmitting data usage information to a vendor, since the application can be configured to collect only certain data based on a predetermined set of rules acceptable to both the customer and the vendor. More accurate collection of data is also provided since the collection of data does not require any manual procedures. In addition, since the system and method can be configured before being placed in operation, the directives of the IT department can be satisfied. Data is presented in a customer readable format, unlike the situation that occurs when direct proxy connection between a device and a vendor gateway which provides data that is difficult to decipher. More accurate and timely billing is provided by eliminating the need for manual meter collection. Acceptable transmission of data is detectable due to the existence of a user friendly interface.

While various exemplary embodiments have been described and illustrated, it is to be understood that many alternatives, modifications and variations would be apparent to those skilled in the art. Accordingly, Applicants intend to embrace all such alternatives, modifications and variations that follow in the spirit and scope of this disclosure.

What is claimed is:

1. A method of transmitting device status information from a first internal network, through a first internal network firewall, over an external communications network to a second network, the first internal network being connected to at least one marking device and to at least one computing device having a memory, the method comprising:

sending a signal from the at least one computing device to the at least one marking device;

receiving data at the least one computing device from the at least one marking device over the first internal network in response to the at least one marking device receiving the signal from the at least one computing device;

storing in the memory of the at least one computing device data previously received from the at least one marking device as a predetermined value, the previously received data and the data received from the at least one marking device correspond to data representative of a number of marked media being generated by the at least one marking device;

comparing with the computing device the received data to the predetermined value stored in the memory of the computing device to provide a comparison result;

generating an indicator that the received data was not within a predetermined range about the predetermined value; and transmitting the received data with the generated indicator from the first internal network, through the firewall, and through the external communications network to the second network in response to the comparison result indicating the received data is within the predetermined range about the predetermined value stored in the memory of the at least one computing device.

2. The method of claim 1, the reception of data from the marking device further comprising:

receiving data from the at least one marking device that includes one of an identification number identifying the at least one marking device, a type of the at least one marking device, and a time at which the data from the at least one marking device was received.

3. The method of claim 2 further comprising:

organizing the data received from the at least one marking device into a table stored in the memory of the least one computing device.

4. The method of claim 1 further comprising:

enabling with the computing device annotation of the data received from the at least one marking device prior to transmission of the received data to the second network.

5. A system of transmitting device status information from a first internal network, through a first internal network firewall, over an external communications network to a second network, the system comprising:

a marking device having a marking engine that generates marked media with a marking material, the marking device operatively connected to the first internal network; and a computing device operatively connected to the first internal network, the computing device including a memory configured to store program instructions and a database and a controller that executes the stored program instructions to:

send a signal from the computing device to the marking device;

store data previously received from the marking device as a predetermined value in the database of the memory of the computing device;

receive data from the marking device over the first internal network in response to the marking device receiving the signal from the computing device, the received data including data representative of a number of marked media generated by the marking device;

compare the data received from the marking device to the predetermined value stored in the memory of the computing device to provide a comparison result;

generate an indicator that the data received from the marking device was not within a predetermined range about the predetermined value; and transmit the data received from the marking device with the generated indicator through the first internal network, the firewall, and the external communications network to the second network in response to the comparison result indicating the data received from the marking device is within the predetermined range about the predetermined value stored in the memory of the computing device.

6. The system of claim 5 wherein the data received from the marking device includes an identification number identifying the marking device, a type for the marking device, and a time at which the data was received from the marking device.

7. The system of claim 5 wherein the memory includes additional program instructions that the controller executes to:

organize the data received from the marking device into a table stored in the database in the memory of the computing device.

8. The system of claim 5 wherein the memory includes additional program instructions that the controller executes to:

enable annotation of the data received from the marking device prior to transmission of the data received from the marking device to the second network.

9. The system of claim 5 wherein the memory includes additional program instructions that the controller executes to:

modify the data received from the marking device prior to transmission of the data received from the marking device to the second network.

* * * * *